(12) United States Patent
Frucht

(10) Patent No.: US 6,188,319 B1
(45) Date of Patent: *Feb. 13, 2001

(54) INTRUDER DETECTOR SYSTEM

(75) Inventor: Yaacov Frucht, Akko (IL)

(73) Assignee: Laser Guard Ltd., Acco (IL)

( * ) Notice: Under 35 U.S.C. 154(b), the term of this patent shall be extended for 0 days.

This patent is subject to a terminal disclaimer.

(21) Appl. No.: 09/302,182

(22) Filed: Apr. 30, 1999

Related U.S. Application Data

(63) Continuation of application No. 08/893,451, filed on Jul. 11, 1997, now Pat. No. 5,910,767.

(51) Int. Cl.$^7$ .................................................. G08B 17/12
(52) U.S. Cl. ........................... 340/557; 340/556; 340/552
(58) Field of Search .................................. 340/557, 556, 340/552

(56) References Cited

U.S. PATENT DOCUMENTS

| | | | |
|---|---|---|---|
| 5,365,218 | 11/1994 | Otto | 340/557 |
| 5,500,525 | 3/1996 | Saban | 250/221 |
| 5,910,767 * | 6/1999 | Frucht | 340/557 |

FOREIGN PATENT DOCUMENTS

WO 94/29755  6/1994  (WO).

* cited by examiner

Primary Examiner—Daniel J. Wu
Assistant Examiner—Tai T. Nguyen
(74) Attorney, Agent, or Firm—Knobbe, Martens, Olson & Bear, LLP

(57) ABSTRACT

An intruder detection system for detecting the presence of an intruder in a protected area. A light beam, preferably from a laser, is reflected from a target, which is a potential intruder. The time period required for the beam to return to a light detector, as well as the intensity of the reflected light, is recorded. The system includes a computer and software for analyzing the measurements of distance and intensity of reflected light. The algorithm for detecting the presence of an intruder is based on changes in the measured distance and/or intensity of reflected light from initial measurements made during a "learning" period. The system tacks targets using data collected in consecutive searches of the area to be protected. Preferably, an alarm is sounded and/or a video camera is slaved to the system.

41 Claims, 3 Drawing Sheets

INTRUDER DETECTOR SYSTEM

This is a Continuation Application of U.S. application No. 08/893,451, filed on Jul. 11, 1997, now U.S. Pat. No. 5,910,767.

FIELD AND BACKGROUND OF THE INVENTION

The present invention relates to an intruder detector system and, in particular, it concerns a system which scans an area with a laser beam and then analyzes the reflected light to determine if an intruder has entered the area.

Security is becoming an increasingly complicated issue in today's world. Even one of the most basic threats, that of an intruder attempting to gain access to a building or other protected area, has become much more difficult to counter. As the technology to protect these secure areas has become more sophisticated, so have those criminal individuals who wish to subvert it. Thus, there is an increasing need for sophisticated systems to detect the presence of these intruders in protected areas.

One example of an attempt to solve this problem is a method of intruder detection which is disclosed in U.S. Pat. No. 4,949,074. In this method, a beam of infrared radiation is projected and the reflected radiation is measured. However, this method does not include the ability to scan a large area or to track a moving intruder. Indeed, the figures and examples in U.S. Pat. No. 4,949,074 show only narrow rectangular corridors, rather than wide, irregularly shaped areas. Furthermore, the range of an infrared beam is also relatively short. Thus, the method of U.S. Pat. No. 4,949,074 is highly limited in potential applications.

Similarly, U.S. Pat. No. 3,715,953 disclosed an serial surveillance and fire-control system which includes a laser rangefinder. However, the rangefinder is used only to aim at a target, and does not actively scan the area under surveillance.

Clearly, being able to scan an entire area would enable intruder detection systems to survey much larger, wider or irregularly shaped areas. Such scanners are also called rangefinders, since they measure the distance between the object and the rangefinder itself. U.S. Pat. No. 4,939,379 discloses a system for actively scanning the surface of an object and measuring its contours. However, this system is designed to be used to scan stationary objects, and has no provisions for detecting or tracking moving objects.

Another example of a range finder is disclosed in U.S. Pat. No. 4,788,441. This range finder includes a light source at a first location, a retroreflector attached to the target at a second location and a photoreceptor. A beam from the light source can be scanned along a path and is then reflected back by the retroreflector. The photoreceptor receives the reflected light. The distance between the light source and the retroreflector is then determined. Without the retroreflector, the device in inoperable. The range finder of U.S. Pat. No. 4,788,441 is thus limited to those situations where a retroreflector can be attached to the target.

However, such a limitation implies the compliance of the target, or of the individual operating the target, with being monitored, Certainly, such compliance would not be available from an intruder attempting to gain access to a protected area, since theses individuals are actually attempting to avoid detection. Thus, clearly a system is required which can also scan a light beam from a light source along a path, collect the reflected light and then analyze it, without requiring a retroreflector. Such a system would be able to detect and analyze light reflected from any objects in the area to be scanned, including human beings.

There is therefore a need for, and it would be highly useful to have, a system for detecting the presence of an intruder in a protected area, which scans the area with alight beam and then analyzes the reflected light to determine if such an individual is present.

SUMMARY OF THE INVENTION

According to the teachings of the present invention, there is provided an intruder detection system for detecting a presence of an intruder in an area to be protected, the system including: (a) a light source for emitting a light beam for scanning the area to be protected and for reflecting from a target, such that the light beam becomes reflected light beam; (b) a detector for receiving the reflected light beam; and (c) an signal processor for determining an intensity of the reflected light beam and a distance of the light source from the target, and for comparing the intensity and the distance to previously stored values of the intensity and the distance, such that a change in a value of the intensity or alternatively of the distance indicates the presence of the intruder.

According to another embodiment of the present invention, there is provided a method of detecting an intruder in an area to be protected, comprising the steps of: (a) scanning the area with a beam of light; (b) collecting light reflected from a target; (c) determining an intensity of the light and a distance to the target; (d) repeating steps (a) to (c) at least once to determine at least a first and a second distance, and a first and second intensity; and (e) analyzing the first distance and the second distance, and the first and the second intensity to determine if the target is the intruder.

According to preferred embodiments of the present invention, the light source is a laser. Also preferably, the previously stored values of the distance and the intensity are obtained by scanning the area to be protected with the light beam. Preferably, the signal processor includes a computer and an algorithm for converting the intensity of light and the period of time required for the reflected light to return to the detector into the distance of the light source from the target. Preferably, the computer further includes an algorithm for tracking the target.

According to another preferred embodiment of the present invention, the intruder detection system further includes an apparatus for visual identification of the target substantially only if the target is the intruder. Also preferably, the apparatus for visual identification is a video camera, and a movement of the video camera is controlled according to the tracking of the target. Alternately and preferably, the system further includes an alarm for being activated substantially only if the target is the intruder.

According to yet another embodiment of the present invention, the intruder detection system further includes a mirror for bending the light beam and a motor for rotating the mirror, such that substantially the entirely of the area to be protected is contacted by the light beam. Alternately and preferably, the system further includes a motor for rotating the detector and the light source, such that substantially the entirety of the area to be protected is contacted by the light beam.

According to still another embodiment of the present invention, there is provided a detection device for detecting a target in an area, comprising: (a) a light source for emitting a light beam; (b) a mirror for bending the light beam; (c) a motor for rotating the mirror, such that the light beam is able to contact substantially the entirety of the area and is able to reflect from the target, such that the light beam becomes a reflected light beam; (d) a detector for receiving the reflected light beam; and (e) an signal processor for determining a value selected from the group consisting of an intensity of the reflected light beam and a distance of the light source from the target.

Hereinafter the term "scanning" refers to the process of moving the light beam around the area to be protected such that reflected light is received from more than one point in that area. Hereinafter the phrase "bending the light beam " refers to reflecting the light beam by a mirror such that the path of the beam is substantially changed.

DESCRIPTION OF THE INVENTION

The present invention is of a device and a method for detecting the presence of an intruder by scanning an area to be protected with a light beam, and then measuring both the intensity of the reflected light and the apparent distance from the device to a reflective object. Methods are disclosed for reducing the number of false alarms by evaluating any change in either the apparent distance from the device to a reflective object, or be evaluating the intensity of the reflected light, or both. These changes are calculated by firs "learning" or preparing a "map" of the area to be protested, in which the area is scanned with the light beam and the values of reflected light and/or the distance from a reflective object to the detector are stored. Any deviations from the stored values for the intensity of reflected light, and/or the distance from the device to any reflective object, are calculated as a change from the "map" of values for the area to be protected.

Measurement of the change of either the apparent distance from the device to a reflective object, or by evaluating the intensity of the reflected light, or both, is extremely important for a number of reasons. First, special equipment and protective clothing are available which minimize reflection of light. By reducing the amount of reflected light, an intruder could potentially evade detection by such a device as the present invention. However, such a reduction in reflected light would reduce, and therefore change, the intensity of the reflected light, as well as increasing the apparent (but not true) distance from the intruder to the device of the present invention. Thus, by measuring any changes in either apparent distance or light intensity, such attempts at evasion can be foiled.

Another reason why measurement of changes is important is for reducing false alarms. As described below, such false alarms can be caused by moving reflective objects such as the branches of bushes or trees which are blown by the wind. However, the device and method of the present invention can determine if the moving reflective object is a tree branch or a human, and act accordingly, because the change in apparent distance and/or light intensity is calculated, and not just the absolute values.

Finally, in preferred embodiments of the present invention, the intruder is tracked by the device of the present invention. Such tracking also requires measurement of changes, since the device must be able to calculate any deviations in intensity of reflected light or apparent distance to the reflective object, and then use these deviations to map the path of the intruder. Small non-critical targets, such as cats, and large non-critical targets, like trucks, are filtered by a size filter.

Hereinafter, the term "intruder" is defined as a human who has entered a protected area. Criminal intent on the part of the intruder is neither implied nor required. Hereinafter, the term "protected area" is defined as any area to be scanned by the light source of the device of the present invention, including a bank, both the interior and the exterior of a prison, a warehouse, a factory, a private home or any other building, any area enclosed by a fence or other perimeter such as research and development parks or a portion thereof, or any mobile or semi-mobile assets. Hereinafter, the term "critical target" is any target which is not permitted in the protected area, such as an intruder, A "non-critical target" is any target whose presence is not considered important, such as a small animal.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for detecting a critical target in a protected area, such as intruders attempting to gain access to the protected area. As noted above, examples of such protected areas include, but are not limited to, buildings such as banks, both the exterior and the interior of prisons, private homes, research and development parks, factories and warehouses. These areas are scanned by a light beam and the reflected light is analyzed to determine if an intruder is present. According to preferred embodiments of the present invention, the analysis is performed using an algorithm which reduces false alarms. If a critical target such as an intruder is detected, an alarm or other warning mechanism may be activated, such as a video camera or other apparatus for visual identification.

The principles and operation of the intruder detection system according to the present invention may be better understood with reference to the drawings and the accompanying description. It is understood that these examples are given for illustrative purposes only and are not intended to be limiting in any way.

Figure 1:
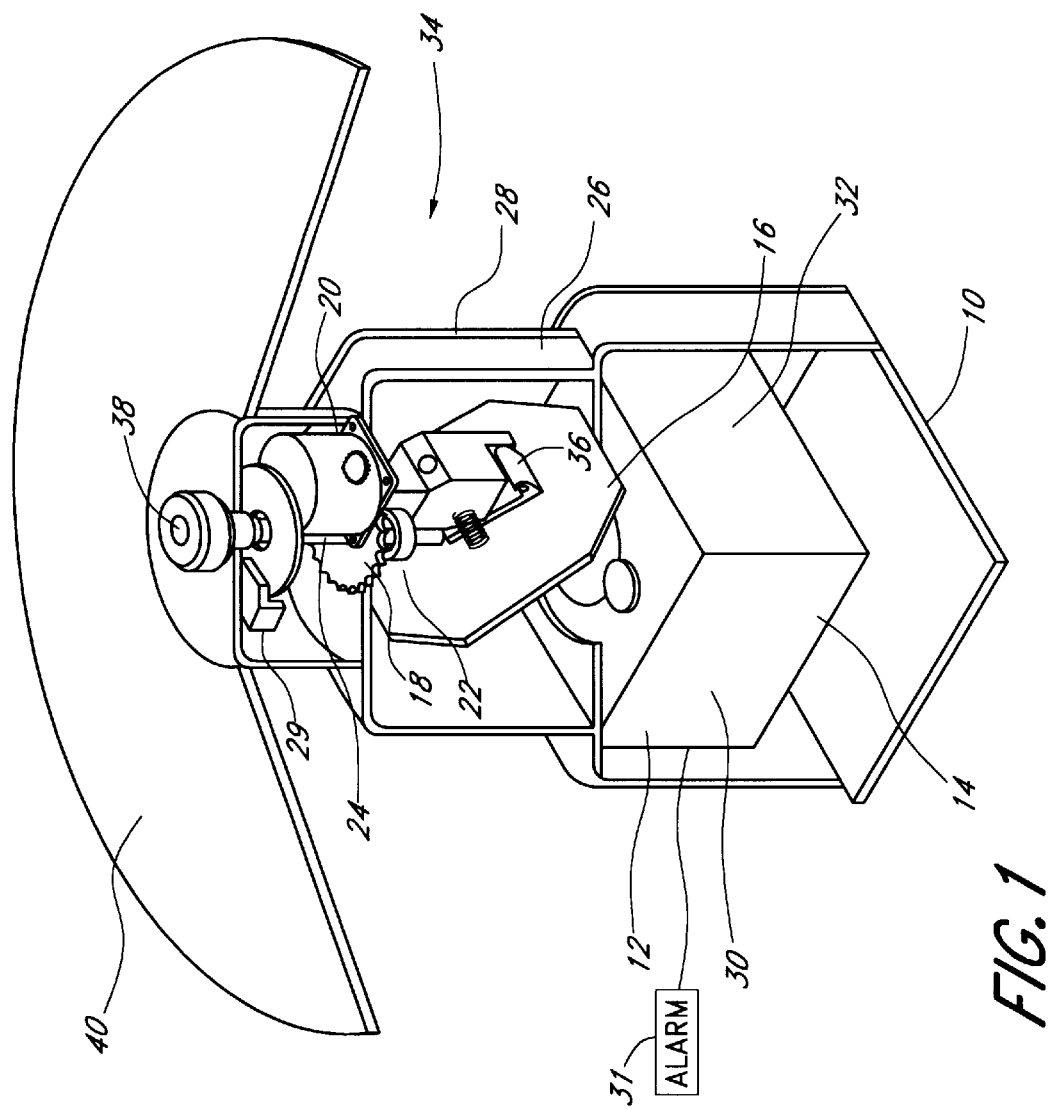
FIG. 1 illustrates one example of the intruder detection system of the present invention.

Referring now to the drawings, FIG. 1 is an illustration of one example of the device of the present invention. An intruder detector system 10 includes laser range finder 12. Laser range finder 12 features light source 14, preferably of collimated light such as a laser and most preferably sending such light in timed pulses. Preferably, the laser used is a class I control laser with a beam width of 1 mrad, which allows a search path radius of 100 meters, yet is safe for operation in the vicinity of humans, Furthermore, the lifetime of such a laser ranges from about 6000 to about 9000 hours, which provides at least a year of continuous operation. The beam from light source 14 is reflected from, and bent by, a mirror 16 in order to scan an area to be protected (not shown).

Mirror 16 is rotated by a motor 20 so that the rays of the scanning beam spread out in the shape of a cone, thereby enabling an area (not shown) to be scanned in a 360 degree circle described by the point of impact of the beam at ground level, which can also be termed a search path or "sweep" of light source 14. Motor 20 drives the rotation of mirror 16 by a gear 18 and a ball bearing 22, through a rotation shaft 24 which is attached at one end to mirror 16. The speed of rotation is preferably determined by a number of factors, including the need to prevent the mirror from cracking or the laser light from burning through an object. Should the device become unable to rotate in one direction, the direction of rotation is preferably reversed to prevent the laser for focusing on any one object for a long period. As an added safety measure, the laser is preferably not focusable to any one point, again to prevent any object from being damaged by the laser.

During operation of intruder detection system 10, light from light source 14 is emitted from laser range finder 12 and passes through a window 26. In the embodiment illustrated, window 26 forms substantially the entirely of a case 28 which surrounds laser range finder 12 and other components of intruder detection system 10. An encoder 29 measures the shaft angular position, so that the scan angle and speed can be controlled by a control algorithm (not shown).

The scanning beam is then reflected from an object or objects in the area to be protected (not shown), which are the target(s), and the reflected light is collected by a detector 30, preferably included in laser range finder 12. The object(s) can be inanimate or animate, human or animal, or even the ground itself. Once the reflected light has been collected by detector 30, the signal is fed to an signal processor 32 for analysis. Preferably, signal processor 32 includes a computer for performing the analysis (one example of one of the algorithms is described below). Preferably, an alarm is then activated if a critical target, such as an intruder, is detected (not shown).

Preferably, light source 14, motor 20 and signal processor 32 are powered by one or more power sources (not shown). examples of a power source include a stand-alone generator, electricity from the power grid and batteries. Also preferably, information such as the timing of the pulses of light from the light source and the height and angle of mirror are also given to the computer in order to detect and track the target.

Preferably, the angle of mirror 16 is adjustable by adjusting a mirror elevation shaft 36 and an elevation adjustment screw 38, respectively. These adjustments permit substantially the entirety of the area to be protected to be scanned (not shown). Also preferably, intruder detection system 10 includes a protective hood 40 for protecting the device from weather elements such as rain and snow.

Figure 2:
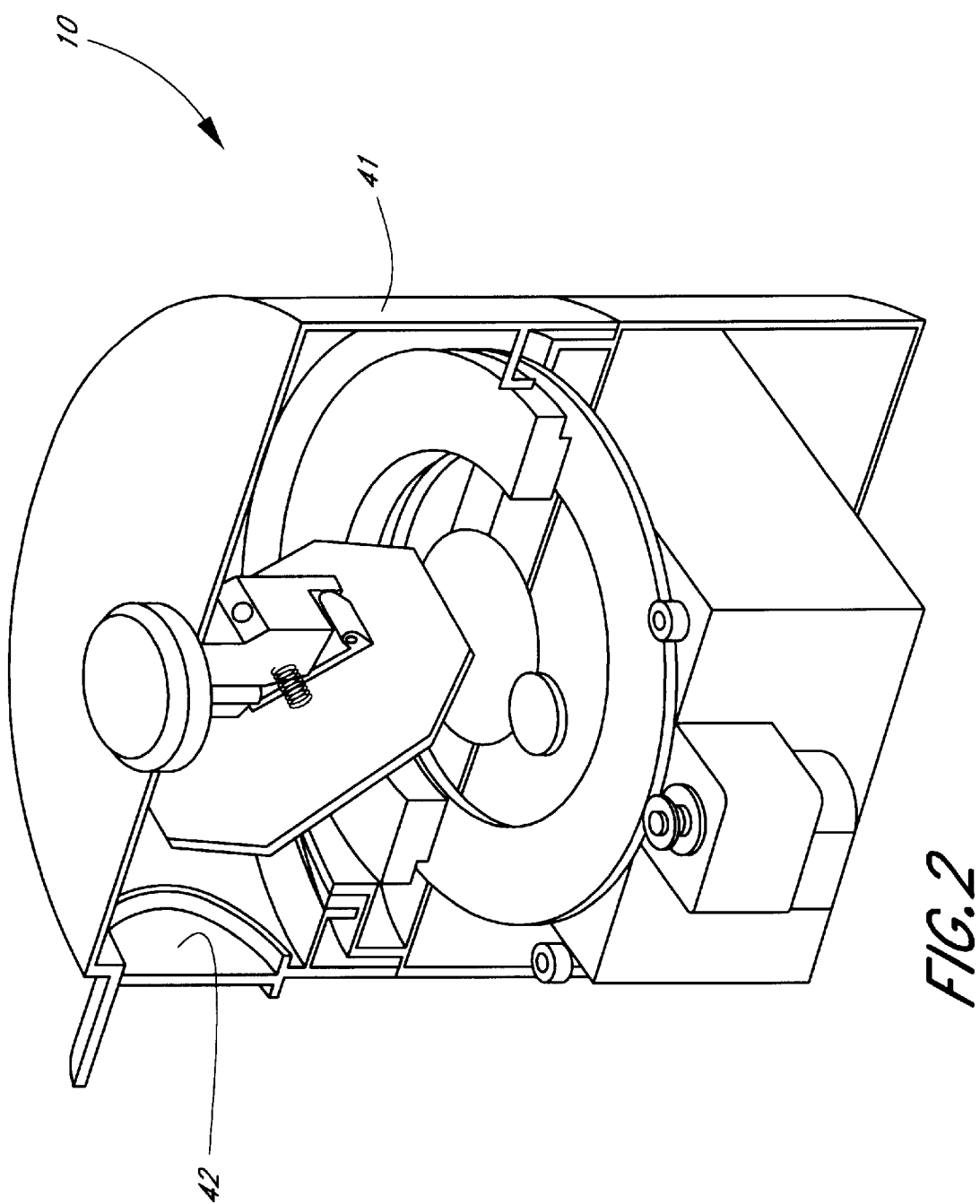
FIG. 2 illustrates a second example of the embodiment of FIG. 1.

A second example of the embodiment illustrated in FIG. 1 is shown in FIG. 2. In this example, intruder detection system 10 is very similar to that shown in FIG. 1, with one exception. A case 41 has a smaller window 42, so that only a portion of case 41 is able to pass light. Also, case 41 rotates synchronously with mirror 16.

Figure 3:
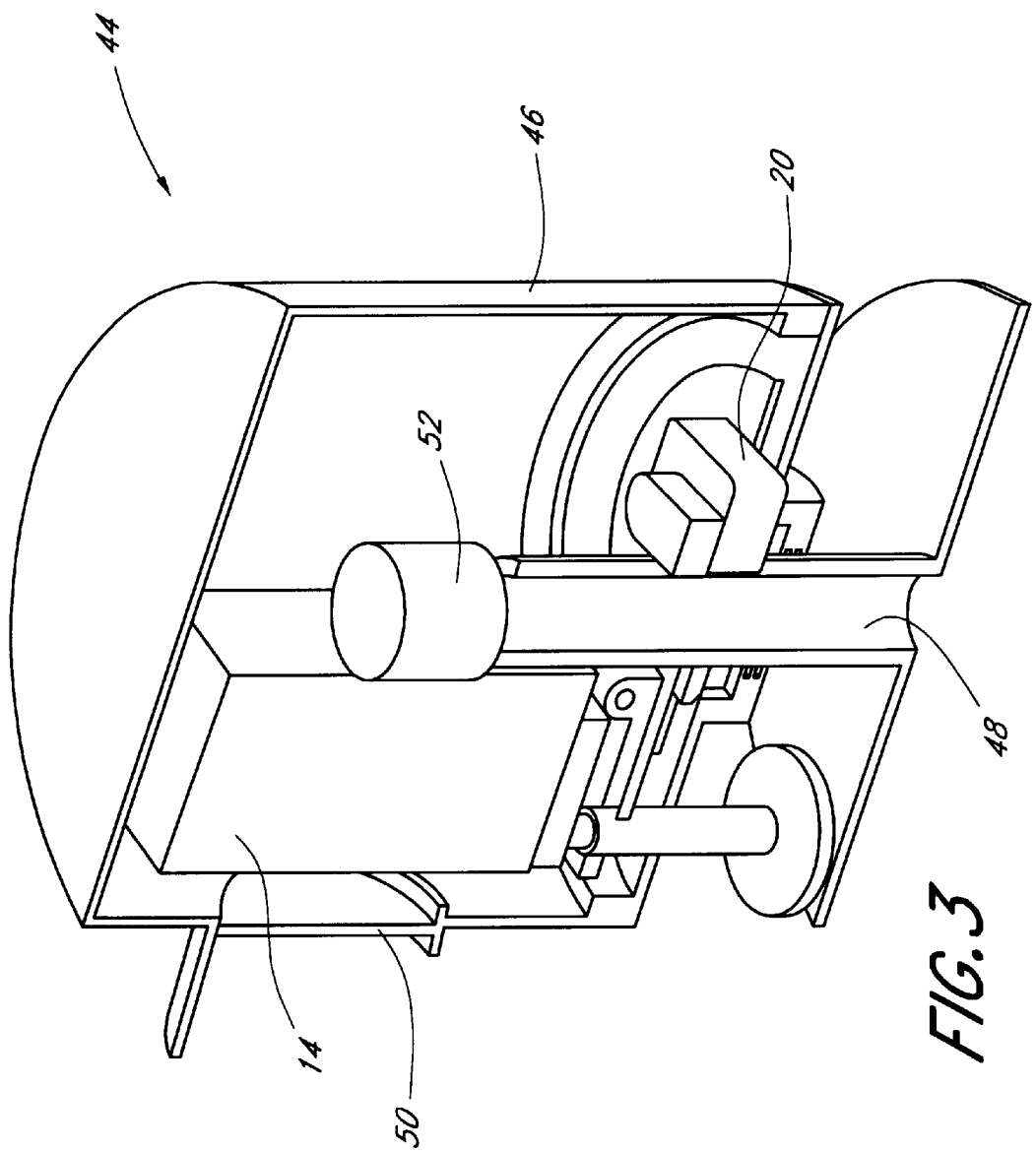
FIG. 3 illustrates an example of a second embodiment of the intruder detention system.

Another embodiment of the present invention is shown in FIG. 3, In this embodiment, an intruder detection system 44 has a case 46 which rotates as a whole. Case 46 rotates about a shaft 48, the rotation being driven by motor 20. A window 50 again occupies only a portion of case 46. Light is emitted from light source 14 and passes through window 50, similarly to previous examples. However, motor 20 now rotates case 46 as a whole, rather than simply rotating the mirror alone, so that substantially the entirety of the area can be scanned with the light beam. In order to facilitate this rotation, and enable an output signal to be collected from detector 30 after processing, as well as allow power to go to motor 20, laser range finder 12 and signal processor 32, a plurality of slip rings 52 is included. Each slip ring 52 enables electrical signals or power to be passed between components of intruder detection system 44, so that movement of case 46 does not impede collection of the electrical signal or the supply of power to components within case 46.

As noted above, the computer or signal processor includes an algorithm for analysis of the signal from the returning reflected light the simplest function of the algorithm is to measure either the apparent distance from the range finder to the object reflecting the light, which is the target, or the intensity of reflected light, or both. Preferably, as further described below, the algorithm also includes further analysis of the reflected light and a decision-making process for determining if there is an intruder in area or if it is a false alarm.

In one embodiment of the algorithm. The light reflected from the target is analyzed and incorporated into a decision-making process from determining if the target is an intruder, in which case an alarm by be sounded or other action taken. Although the following discussion centers upon humans as critical targets, it should be noted that this is for discussion purposes only and is not meant to be limiting in any way. Finally, the following algorithm is an example of an algorithm for finding the range only, although the method and device of the present invention also calculate both the intensity of received light and any changes in that intensity. The method and algorithm are preferred as follows.

First, the scanning beam is swept around the area to be protected, preferably in a complete circle for a complete search. Since the beam is rotated around the area in a path which can be described as at least a partial circle, if not a complete circle, the search path can be divided into separate angular samples. The number of such angular samples is $N_a$. In order to determine if a target is a human, or alternately a non-critical target such as a animal, the search beam must be reflected from the target several times during a single search period. A high resolution is therefore required, preferably about 1 mrad. If a resolution of 1 mrad is obtained, then the number of separate angular samples in a search path of one complete circle is 6250, so that $N_a=6250$. The total number of measurements of the range, or distance from the light source to the target, is at least one, and preferably two. The measurement of the range in each angular sample is given as $N_r$.

In order to analyze the signal from the reflected light, the values of the measured range in each angular sample are collected and stored in the memory of the computer. Both the current measurement and at least one previous measurement are stored in a FIFO memory unit. These measurements are overlapped, and the resulting pattern analyzed, in order to identify the nature of the target.

Preferably, the computer, or other device which runs the algorithm, "learns" the area to be protected first in order to be able to determine if a moving object is a plant or other inanimate object being moved by the wind. During the measurement of the range from the light source to the target, both the average and the standard deviation of values in all angular samples $N_a$ are considered. If the number of previous measurements, made before the current measurement is "J", then any differences in the value of the current measurement from the previous "J" measurements are considered. Both the average value and the standard deviation ($\sigma$) are updated during the search.

$$\overline{R}(n_a) = \frac{1}{J*N_r} \sum_{j=1}^{J} \sum_{n_r=1}^{N} R(n_a, j, n_r)$$

$$\sigma(n_a) = \sqrt{\frac{1}{J*N_r} \sum_{j=1}^{J} \sum_{n_r=1}^{N} [R(n_a, j, n_r) - \overline{R}(n_a)]^2}$$

$$S(n_a) = \overline{R}(n_a) - k\sigma(n_a) - \Delta R_{mm}$$

Examples of the actual equations employed are as above, it being understood that these examples are for illustrative purposes only and are not meant to be limiting. Furthermore, as noted above, these equations are only for determining the apparent distance, or range, from the device of the present invention to the target.

In these equations, $R(n_a)$ is the average of the measurement of the range in each angular sample $n_a$ from $N_a$. The standard deviation is $s(n_a)$. The limit of sensitivity, or threshold, for each angular sample $n_a$ is $(n_a)$. k is a positive constant for multiplying with the standard deviation. $\Delta R_{min}$ is a positive constant to determine the minimal range difference. The threshold is calculated during the "learning" procedure for determining the map of ranges of the area to be protected, as described previously. The equation are used as follows.

The measured range stored in FIFO memory is $R(n_a, j, n_r)$. when a target enters the area to be protected, the measured range in a particular angular sample changes, which then alerts the system to the possible presence of an intruder in the area to be protected.

Specifically, if the measured range in a particular angular sample is less than the measured threshold, or $R(n_a)<S(n_a)$, then a potential target may have entered the area, thus changing the map of measured ranges in the area. These differences are entered into memory, along with the number of the sweep, the total range and the change in the measured range. The system then tests the measured date as described below, in order to decide if the target is in fact an intruder.

The resolution of the laser light beam is sufficiently fine that a human target must be present in a plurality of consecutive angular samples of the search path, rather than just one angular sample The system exploits this requirement by first checking to see if a number of consecutive samples are affected by the apparent change in the measured range. The exact number of angular samples affected depends at least partially upon the radius of the search path. However, a predefined number of consecutive angular samples should be affected if a human target has entered the area, rather than a small animal or other moving but non-critical target, or even artifacts such as system noise.

If at least the predefined number of consecutive angular samples is affected, then the average measured range to the target and its width, as determined by the number of angular samples affected, is entered into the memory. Next, consecutive complete search paths, or complete sweeps of the area to be protected, are examined for the above measurements. Whether a target is moving or stationary will be revealed during consecutive sweeps, by changes in the above measurements. The system uses this information to track the target, both to determine if the target is moving, and the speed and angle of movement. If the target is moving, and meets the minimum (empirical) width requirement for a human target, the target is then tracked.

The system then used the speed and angle of movement to determine if the target is crawling, or walking upright or in a bent position. The memory records the coordinates of movement, the position during movement and the speed of the target. A video or still camera can be trained on the target to record various types of visual information. An alarm is preferably activated once the presence of a human target has been fully determined.

In preferred embodiments of the present invention, the target is automatically tracked, and the path of the target is displayed to the operator by a computer screen or other display device (not shown). Preferably, the device of the present invention includes a video camera or other visual identification device which is slaved to the intruder detection system. Such a video camera would then automatically follow the intruder, according to the path determined by the intruder detection system, and would display visual information to an operator on a television screen, for example.

In still other preferred embodiments of the present invention, the intruder detection system is able to track multiple targets. Preferably, the path of each target is shown separately to an operator, optionally on a display screen with each path marked with a different color, for example.

As noted above, the presence of a human target is at least partially determined by the apparent width, or number of angular samples in which the target is present. The best values for such a width depend at least partly upon the radius of the search path and the number of angular samples within that path. Such values can be easily determined, either empirically or by calculation, for any values of the radius and the number of angular samples. The apparent width is used to eliminate such artifacts as a small moving animal. The height of the laser relative to the ground is also important, for two reasons. First, if the height is sufficiently large, small animals simply won't be detected by the reflectance of the light beam. Second, the height of the target can be specifically measured, thereby enabling the system to determine if the target is a walking or crawling human, which could be important for the positioning of such detection devices as a video camera.

It will be appreciated that the above descriptions are intended only to serve as examples, and that may other embodiments are possible within the spirit and the scope of the present invention.

What is claimed is:

1. An intruder detection system for detecting a presence of an intruder in an area to be protected, the system comprising:
   (a) a light source for emitting a light beam for scanning the area to be protected and for reflecting from a target, such that said light beam becomes a reflected light beam;
   (b) a detector for receiving said reflected light beam; and
   (c) an signal processor for determining a value from said reflected light beam, and for comparing said value to a previously stored value, such that a change in said value indicates the presence of the intruder.

2. The intruder detection system of claim 1, wherein said value is an intensity of said reflected light beam, such that a change in said value of said intensity indicates the presence of the intruder.

3. The intruder detection system of claim 1, wherein said value is a distance of said light source from said target, such that a change in said value of said distance indicates the presence of the intruder.

4. The intruder detection system of claim 3, wherein said signal processor includes a computer and an algorithm for converting a period of time required for said reflected light to return to said detector into said distance of said light source from said target.

5. The intruder detection system of claim 4, further comprising an apparatus for visual identification of said target substantially only if said target is the intruder.

6. The intruder detection system of claim 4, wherein said computer further includes an algorithm for tracking said target.

7. The intruder detection system of claim 6, wherein said apparatus for visual identification is a video camera, and a movement of said video camera is controlled according to said tracking of said target.

8. The intruder detection system of claim 4, further comprising an alarm for being activated substantially only if said target is the intruder.

9. The intruder detection system of claim 1, wherein said light source is a laser.

10. The intruder detection system of claim 1, wherein said previously stored value is obtained by scanning at least a portion of the area to be protected with said light beam.

11. The intruder detection system of claim 1, further comprising a mirror for bending said light beam and a motor for rotating said mirror, such that at least a portion of the area to be protected is contacted by said light beam.

12. The intruder detection system of claim 1, further comprising a motor for rotating said detector and said light source, such that at least a portion of the area to be protected is contacted by said light beam.

13. A detection device for detecting a target in an area, comprising:
(a) a light source for emitting a light beam;
(b) a mirror for bending said light beam;
(c) a motor for rotating said mirror, such that said light beam is able to contact at least a portion of the area and is able to reflect from the target, such that said light beam becomes a reflected light beam;
(d) a detector for receiving said reflected light beam; and
(e) an signal processor for determining a value selected from the group consisting of an intensity of said reflected light beam and a distance fo said light source from said target.

14. The detection device of claim 13, wherein said signal processor compares said value to at least one previously stored value, such that a change in said value indicates the presence of the intruder.

15. The detection device of claim 13, wherein said light source is a laser.

16. The detection device of claim 14, wherein said previously stored values of said distance are obtained by scanning at lest a portion of the area to be protected with said light beam.

17. The detection device of claim 16, wherein said signal processor includes a computer and an algorithm for converting a period of time required for said reflected light to return to said detector into said distance of said light source from said target.

18. The detection device of claim 17, wherein said computer further includes an algorithm for tracking said target.

19. The detection device of claim 18, further comprising a video camera, wherein a movement of said video camera is controlled according to said tracking of said target.

20. The detection device of claim 14 wherein said previously stored values of said intensity are obtained by scanning at least a portion of the area to be protected with said light beam.

21. A method of detecting an intruder in an area to be protected, comprising the steps of:
(a) scanning the area with a beam of light;
(b) collecting light reflected from a target to form collected light;
(c) determining a value from said collected light; repeating steps (a) to (c) at least once to determine at least a first value and a second value; and
(e) analyzing said first value and said second value to determine if said target is the intruder.

22. The method of claim 1, wherein said value is an intensity of said collected light.

23. The method of claim 1, wherein said value is a distance to said target.

24. A detection device for detecting a target in an area, the device comprising:
(a) a light source of emitting a light beam;
(b) a mirror for bending said light beam;
(c) a rotation shaft for supporting said mirror;
(d) a motor for rotating said mirror, said motor being rotatably connected to said rotation shaft, such that said light beam is scanned around the area and such that said light is a reflected light beam; and
(e) an encoder for determining a shaft angular positions, such that an angle of said mirror is determined according to said shaft angular position and such that said light beam contacts at least a portion of the area, such that the target is detected in the area according to said reflected light beam.

25. The device of claim 24, further comprising a case for containing said light source, said mirror, said motor, said rotation shaft and said encoder, said case featuring a window such that said light beam passes through said window to scan at least a portion of the area.

26. The device of claim 25, wherein said case is stationary and said window forms substantially the entirety of the case.

27. The device of claim 25, wherein said case rotates, the device further comprising:
(f) a shaft, said case being rotatably connected to said shaft, said shaft being rotated by said motor, such that said case is rotated;
(g) a power source for supplying power to said motor and to said light source; and
(h) a plurality of slip rings, said slip rings being electrically connected to said power source and to said motor and to said light source, such that power is supplied to said motor and to said light source from said power source.

28. The method of claim 21, further comprising determining from said collected light a width of the target.

29. The method of claim 28, further comprising determining whether the width satisfied a minimum width requirement for a human target.

30. The method of claim 21, further comprising determining, from reflected light collected over multiple sweeps of the beam of light, whether the target is moving.

31. The method of claim 30, further comprising displaying a path of the target to an operator on a computer screen.

32. A method of monitoring an area for intruders, comprising
sweeping a beam of light across a path of the area multiple times;
monitoring light reflected from targets along said path as the beam of light is swept across the path;
storing numerical representations of said reflected light within a memory; and
evaluating said numerical representations to determine whether a target is an intruder.

33. The method of claim 32, wherein evaluating said numerical representations comprises determining whether a target satisfies a width requirement.

34. The method of claim 32, wherein evaluating said numerical representations comprises comparing the numerical representations resulting from consecutive sweeps of the beam of light to determine whether the target is moving.

35. The method of claim 34, further comprising tracking the target if the target is moving.

36. The method of claim 35, further comprising displaying a path of the target to an operator on a computer screen.

37. The method of claim 35, further comprising controlling a video camera to cause the video camera to follow a path of the target.

38. The method of claim 35, further comprising calculating a speed and angle of movement of the target using said numerical representations.

39. The method of claim 32, wherein the beam of light is generated by a laser.

40. The method of claim 32, wherein the numerical representations comprise values representing light intensity levels.

41. The method of claim 40, wherein the numerical representations further comprise values representing distances to said targets.

* * * * *